United States Patent [19]
Wainauski et al.

[11] Patent Number: 5,791,878
[45] Date of Patent: Aug. 11, 1998

[54] AIRFOILED BLADE FOR CARGO TRANSPORT AIRCRAFT

[75] Inventors: Harry S. Wainauski; Mark D. Saperstein, both of Simsbury, Conn.

[73] Assignee: United Technologies Corporation, Windsor Locks, Conn.

[21] Appl. No.: 814,148

[22] Filed: Mar. 10, 1997

[51] Int. Cl.⁶ .................................................. B64C 11/18
[52] U.S. Cl. ................ 416/223 R; 416/243; 416/DIG. 5; 416/DIG. 2
[58] Field of Search .................. 416/223 R, 243, 416/DIG. 5, DIG. 2

[56] References Cited

U.S. PATENT DOCUMENTS

| | | | |
|---|---|---|---|
| 4,519,746 | 5/1985 | Wainauski et al. | 416/223 R |
| 4,773,825 | 9/1988 | Rodde et al. | 416/223 R |
| 4,830,574 | 5/1989 | Wainauski et al. | 416/223 R |
| 4,834,617 | 5/1989 | Wainauski et al. | 416/242 |
| 4,911,612 | 3/1990 | Rodde et al. | 416/223 R |
| 4,941,803 | 7/1990 | Wainauski et al. | 416/242 |

FOREIGN PATENT DOCUMENTS

002015062C1  6/1994  Russian Federation ........... 416/223 R

*Primary Examiner*—Edward K. Look
*Assistant Examiner*—Richard Woo

[57] ABSTRACT

An airfoiled blade is disclosed which comprises a plurality of airfoil sections, a root portion, and a tip portion. Each section has along substantially the entire length thereof a cross-sectional airfoil shape characterized by a parabolic leading edge, a front loading and a blunt trailing edge. Each of the airfoil sections has a chord passing therethrough with a 50% point and a maximum thickness forward of the 50% point, toward the leading edge. A thickness ratio range from a first of the airfoil sections nearest the tip portion to a last of the airfoil sections nearest the root portion of substantially 3% to 28% is preferred. In one embodiment, the blade further includes a second airfoil section, a third airfoil section and a fourth airfoil section located between the first and last airfoil sections. The first airfoil section has a thickness ratio of substantially 3.3%, the second airfoil section has a thickness ratio of substantially 4.1%, the airfoil section has a thickness ratio of substantially 7.3%, the fourth airfoil section has a thickness ratio of substantially 14.3%, and the last airfoil section has a thickness ratio of substantially 27.4%.

4 Claims, 11 Drawing Sheets

FIG.1A prior art

AIRFOIL SUMMARY TAKEOFF 50 KTAS

| Ymax/C | Mn | | HS1 | HS2 |
|---|---|---|---|---|
| 0.0330 | 0.6213 | CL<br>CD<br>ALPHA<br>MN MAX<br>X SEP | NO<br>DATA | 0.73290<br>0.00759<br>-0.29100<br>1.18100<br>--- |
| 0.0410 | 0.4994 | CL<br>CD<br>ALPHA<br>MN MAX<br>X SEP | 1.31250<br>0.01814<br>7.07170<br>2.13500<br>1.00000 | 0.86010<br>0.00859<br>2.96000<br>1.15800<br>--- |
| 0.0730 | 0.3406 | CL<br>CD<br>ALPHA<br>MN MAX<br>X SEP | 1.32510<br>0.01220<br>6.54320<br>0.76580<br>0.97290 | 1.31700<br>0.00934<br>7.78600<br>1.63200<br>0.94900 |
| 0.1430 | 0.1990 | CL<br>CD<br>ALPHA<br>MN MAX<br>X SEP | 1.38510<br>0.01292<br>8.74900<br>0.37630<br>0.84189 | 1.37900<br>0.01320<br>9.07500<br>0.43090<br>0.87400 |
| 0.2740 | 0.1282 | CL<br>CD<br>ALPHA<br>MN MAX<br>X SEP | 1.21120<br>0.01037<br>8.86230<br>0.24900<br>0.75159 | 1.19660<br>0.00927<br>7.39000<br>0.22200<br>0.75800 |

FIG.1B prior art

AIRFOIL SUMMARY TAKEOFF
110 KTAS

| Ymax/C | Mn | | HS1 | HS2 |
|---|---|---|---|---|
| 0.0330 | 0.6428 | CL<br>CD<br>ALPHA<br>MN MAX<br>X SEP | NO<br>DATA | 0.43600<br>0.00748<br>-0.34000<br>0.80800<br>--- |
| 0.0410 | 0.5264 | CL<br>CD<br>ALPHA<br>MN MAX<br>X SEP | 0.92570<br>0.00794<br>3.99880<br>1.27350<br>0.97983 | 0.82500<br>0.00909<br>2.61600<br>0.96600<br>0.99960 |
| 0.0730 | 0.3759 | CL<br>CD<br>ALPHA<br>MN MAX<br>X SEP | 1.07030<br>0.10490<br>4.15260<br>0.64550<br>0.97279 | 1.06590<br>0.00997<br>5.48000<br>0.95400<br>0.97900 |
| 0.1430 | 0.2501 | CL<br>CD<br>ALPHA<br>MN MAX<br>X SEP | 0.98030<br>0.01212<br>5.16930<br>0.40800<br>0.87069 | 0.97850<br>0.01222<br>5.43000<br>0.41620<br>0.92400 |
| 0.2740 | 0.1942 | CL<br>CD<br>ALPHA<br>MN MAX<br>X SEP | 0.60270<br>0.00941<br>3.86520<br>0.31970<br>0.81875 | 0.60300<br>0.01005<br>2.53000<br>0.29500<br>0.82400 |

FIG.1C
prior art

AIRFOIL SUMMARY TAKEOFF
300.5 KTAS

| Ymax/C | Mn | | HS1 | HS2 |
|---|---|---|---|---|
| 0.0330 | 0.8659 | CL<br>CD<br>ALPHA<br>MN MAX<br>X SEP | NO<br>DATA | 0.45870<br>0.02430<br>−1.13000<br>1.54000<br>0.87900 |
| 0.0410 | 0.7565 | CL<br>CD<br>ALPHA<br>MN MAX<br>X SEP | 0.48400<br>0.00790<br>−0.39300<br>1.02850<br>0.99959 | 0.43530<br>0.00864<br>−1.11900<br>2.23600<br>−−− |
| 0.0730 | 0.6254 | CL<br>CD<br>ALPHA<br>MN MAX<br>X SEP | 0.40030<br>0.00827<br>−2.01160<br>1.11970<br>0.99302 | 0.40060<br>0.00889<br>−0.77660<br>0.83200<br>−−− |
| 0.1430 | 0.5243 | CL<br>CD<br>ALPHA<br>MN MAX<br>X SEP | 0.28670<br>0.00966<br>−1.40040<br>0.89140<br>0.99227 | 0.28900<br>0.00916<br>−0.96020<br>0.71900<br>0.96200 |
| 0.2740 | 0.4900 | CL<br>CD<br>ALPHA<br>MN MAX<br>X SEP | 0.17620<br>0.00852<br>0.28950<br>0.78310<br>0.85042 | 0.18210<br>0.00962<br>−1.05800<br>0.75600<br>0.84040 |

FIG. 4A

AIRFOIL SUMMARY TAKEOFF
50 KTAS

| Ymax/C | Mn | | HS1 | HS1A | HS2 |
|---|---|---|---|---|---|
| 0.0330 | 0.6213 | CL | NO DATA | 0.43250 | 0.73290 |
| | | CD | | 0.00763 | 0.00759 |
| | | ALPHA | | 1.04070 | -0.29100 |
| | | MN MAX | | 0.78530 | 1.18100 |
| | | X SEP | | --- | --- |
| 0.0410 | 0.4994 | CL | 1.31250 | 0.86190 | 0.86010 |
| | | CD | 0.01814 | 0.00830 | 0.00859 |
| | | ALPHA | 7.07170 | 4.35010 | 2.96000 |
| | | MN MAX | 2.13500 | 1.75260 | 1.15800 |
| | | X SEP | 1.00000 | 0.99959 | --- |
| 0.0730 | 0.3406 | CL | 1.32510 | 1.32420 | 1.31700 |
| | | CD | 0.01220 | 0.01177 | 0.00934 |
| | | ALPHA | 6.54320 | 7.32780 | 7.78600 |
| | | MN MAX | 0.76580 | 0.93540 | 1.63200 |
| | | X SEP | 0.97290 | 0.94965 | 0.94900 |
| 0.1430 | 0.1990 | CL | 1.38510 | 1.39020 | 1.37900 |
| | | CD | 0.01292 | 0.01367 | 0.01320 |
| | | ALPHA | 8.74900 | 7.85150 | 9.07500 |
| | | MN MAX | 0.37630 | 0.28450 | 0.43090 |
| | | X SEP | 0.84189 | 0.99557 | 0.87400 |
| 0.2740 | 0.1282 | CL | 1.21120 | 1.21440 | 1.19660 |
| | | CD | 0.01037 | 0.00957 | 0.00927 |
| | | ALPHA | 8.86230 | 8.71790 | 7.39000 |
| | | MN MAX | 0.24900 | 0.24600 | 0.22200 |
| | | X SEP | 0.75159 | 0.75322 | 0.75800 |

FIG. 4B

AIRFOIL SUMMARY TAKEOFF
110 KTAS

| Ymax/C | Mn | | HS1 | HS1A | HS2 |
|---|---|---|---|---|---|
| 0.0330 | 0.6428 | CL | NO DATA | 0.43670 | 0.43600 |
|  |  | CD |  | 0.00756 | 0.00748 |
|  |  | ALPHA |  | 0.98930 | -0.34000 |
|  |  | MN MAX |  | 0.81210 | 0.80800 |
|  |  | X SEP |  | --- | --- |
| 0.0410 | 0.5264 | CL | 0.92570 | 0.82690 | 0.82500 |
|  |  | CD | 0.00794 | 0.00753 | 0.00909 |
|  |  | ALPHA | 3.99880 | 3.85180 | 2.61600 |
|  |  | MN MAX | 1.27350 | 1.58400 | 0.96600 |
|  |  | X SEP | 0.97983 | 1.00000 | 0.99600 |
| 0.0730 | 0.3759 | CL | 1.07030 | 1.06950 | 1.06590 |
|  |  | CD | 0.10490 | 0.01025 | 0.00997 |
|  |  | ALPHA | 4.15260 | 4.94730 | 5.48000 |
|  |  | MN MAX | 0.64550 | 0.69650 | 0.95400 |
|  |  | X SEP | 0.97279 | 0.97274 | 0.97900 |
| 0.1430 | 0.2501 | CL | 0.98030 | 0.98410 | 0.97850 |
|  |  | CD | 0.01212 | 0.01327 | 0.01222 |
|  |  | ALPHA | 5.16930 | 4.08700 | 5.43000 |
|  |  | MN MAX | 0.40800 | 0.40640 | 0.41620 |
|  |  | X SEP | 0.87069 | 0.99559 | 0.92400 |
| 0.2740 | 0.1942 | CL | 0.60270 | 0.60440 | 0.60300 |
|  |  | CD | 0.00941 | 0.00882 | 0.01005 |
|  |  | ALPHA | 3.86520 | 3.52380 | 2.53000 |
|  |  | MN MAX | 0.31970 | 0.32060 | 0.29500 |
|  |  | X SEP | 0.81875 | 0.80389 | 0.82400 |

FIG.4C

AIRFOIL SUMMARY TAKEOFF
300.5 KTAS

| Ymax/C | Mn | | HS1 | HS1A | HS2 |
|---|---|---|---|---|---|
| 0.0330 | 0.8659 | CL | NO DATA | 0.46020 | 0.45870 |
|  |  | CD |  | 0.01472 | 0.02430 |
|  |  | ALPHA |  | 0.01090 | -1.13000 |
|  |  | MN MAX |  | 1.22710 | 1.54000 |
|  |  | X SEP |  | 0.98021 | 0.87900 |
| 0.0410 | 0.7565 | CL | 0.48400 | 0.48400 | 0.43530 |
|  |  | CD | 0.00790 | 0.00785 | 0.00864 |
|  |  | ALPHA | -0.39300 | 0.29320 | -1.11900 |
|  |  | MN MAX | 1.02850 | 1.01150 | 2.23600 |
|  |  | X SEP | 0.99959 | — | — |
| 0.0730 | 0.6254 | CL | 0.40030 | 0.39990 | 0.40060 |
|  |  | CD | 0.00827 | 0.00803 | 0.00889 |
|  |  | ALPHA | -2.01160 | -1.39050 | -0.77660 |
|  |  | MN MAX | 1.11970 | 0.93020 | 0.83200 |
|  |  | X SEP | 0.99302 | 0.99309 | — |
| 0.1430 | 0.5243 | CL | 0.28670 | 0.28730 | 0.28900 |
|  |  | CD | 0.00966 | 0.00983 | 0.00916 |
|  |  | ALPHA | -1.40040 | -2.20030 | -0.96020 |
|  |  | MN MAX | 0.89140 | 0.81290 | 0.71900 |
|  |  | X SEP | 0.99227 | 0.94381 | 0.96200 |
| 0.2740 | 0.4900 | CL | 0.17620 | 0.17700 | 0.18210 |
|  |  | CD | 0.00852 | 0.00838 | 0.00962 |
|  |  | ALPHA | 0.28950 | -0.01330 | -1.05800 |
|  |  | MN MAX | 0.78310 | 0.79740 | 0.75600 |
|  |  | X SEP | 0.85042 | 0.83562 | 0.84040 |

AIRFOILED BLADE FOR CARGO TRANSPORT AIRCRAFT

TECHNICAL FIELD

This invention is directed to airfoiled blades, and more particularly, to an improved propeller blade comprising a new airfoil system, which has particular application for use with cargo aircraft.

BACKGROUND ART

The prior art includes a plurality of airfoiled blades for various applications. Such applications include blades specifically designed to reduce weight, blades specifically designed for use with commuter aircraft, and thin swept blades for reliable high speed performance.

For cargo aircraft engines operating in the 4000–5,000 horsepower range, propellers are required that produce high static thrust for short takeoff requirements and yet are efficient in cruise mode. If performance is optimal in these applications, performance will be more than adequate in intermediate applications such as in climb. Such requirements demand that the airfoiled sections of the blades comprising the propeller be tailored for a specific aircraft/engine combination so as to deliver optimum performance. Prior to this application, no airfoiled blades exist which ideally meet these requirements for cargo type aircraft.

For example, U.S. Pat. No. 4,830,574 to Wainauski et al. discloses an airfoiled blade directed to minimizing propeller weight by utilizing narrow chord blades. U.S. Pat. No. 4,834,617 to Wainauski discloses an airfoiled blade which is thin swept having its application as a prop fan with high tip speed and mach numbers. U.S. Pat. No. 4,941,803 to Wainauski et al discloses an airfoiled blade designed for high loading and high efficiency at relatively high mach numbers. U.S. Pat. No. 4,519,746 to Wainauski et al discloses an airfoiled blade which is directed for use with commuter aircraft.

Current propeller blades which are used for cargo aircraft are found in two of the above described patents which are specifically designed not for cargo but for commuter and high speed aircraft. The Hamilton Standard propeller blade HS1, which is directed for use with commuter aircraft, is found in U.S. Pat. No. 4,519,746 and the Hamilton Standard blade HS2, which is directed for high speed aircraft, is found in U.S. Pat. No. 4,830,574. The performance characteristics of these blades are summarized in the tables of FIGS. 1A–1C for 50 and 110 knot conditions at takeoff, and 300.5 knot conditions at cruise, wherein CL=Airfoil operating lift coefficient defined by Lift/qA, wherein Lift is airfoil lift, q is dynamic pressure, and A is airfoil area;

CD=Airfoil operating drag coefficient;

ALPHA=Airfoil operating angle of attack;

MN MAX=Maximum airfoil surface Mach number; and

X SEP=Chordwise location of flow separation from airfoil (x/c) (Ideally, 1.0000 indicates no separation)

The performances represented by these tables is adequate considering these airfoiled blades are specifically designed for applications other than cargo transport. However, review of the Figures shows values of MN MAX greater than 1.0000 and X SEP values less than 1.0000 which results in large losses. Thus, by specifically directing airfoil design criteria toward the engine and aircraft used for cargo transport, such as the C130 aircraft, improved cruise efficiencies, drag levels, and other performance characteristics can be achieved.

There exists a need, therefore, for a new airfoiled blade which is designed specifically for improved performance of cargo transport type aircraft.

DISCLOSURE OF THE INVENTION

The primary object of this invention is to provide an improved airfoiled blade having a new airfoil system.

Another object of this invention is to provide an improved airfoiled blade for use on a propeller, wherein airfoils comprising the blade are specifically designed for use with a cargo transport aircraft for producing high static thrusts and efficient performance in cruise mode.

Yet another object of this invention is to provide an improved airfoiled blade for use on a propeller of a cargo aircraft, wherein the blade design results in improved propeller performance levels which surpass blades using currently available airfoil families.

The objects and advantages are achieved by the airfoiled blade of the present invention which comprises a plurality of airfoil sections, a root portion, and a tip portion. Each section has along substantially the entire length thereof a cross-sectional airfoil shape characterized by a parabolic leading edge, a front loading and a blunt trailing edge. Each of the airfoil sections has a chord passing therethrough with a 50% point and a maximum thickness forward of the 50% point, toward the leading edge. A thickness ratio range from a first of the airfoil sections nearest the tip portion to a last of the airfoil sections nearest the root portion of substantially 3% to 28% is preferred. In one embodiment, the blade further includes a second airfoil section, a third airfoil section and a fourth airfoil section located between the first and last airfoil sections. The first airfoil section has a thickness ratio of substantially 3.3%, the second airfoil section has a thickness ratio of substantially 4.1%, the airfoil section has a thickness ratio of substantially 7.3%, the fourth airfoil section has a thickness ratio of substantially 14.3%, and the last airfoil section has a thickness ratio of substantially 27.4%.

BRIEF DESCRIPTION OF THE DRAWINGS

FIGS. 1A–1C are tables including parameters indicative of performance and drag of prior art airfoiled blades, at 50, 110 and 300.5 knots, respectively;

FIGS. 4A–4C are tables including parameters indicative of performance characteristics of the blade of the present invention including efficiency and drag at 50, 110, and 300.5 knots, respectively, in comparison with the values from the tables of FIGS. 1A–1C, for the prior art;

BEST MODE FOR CARRYING OUT THE INVENTION

Figure 2:
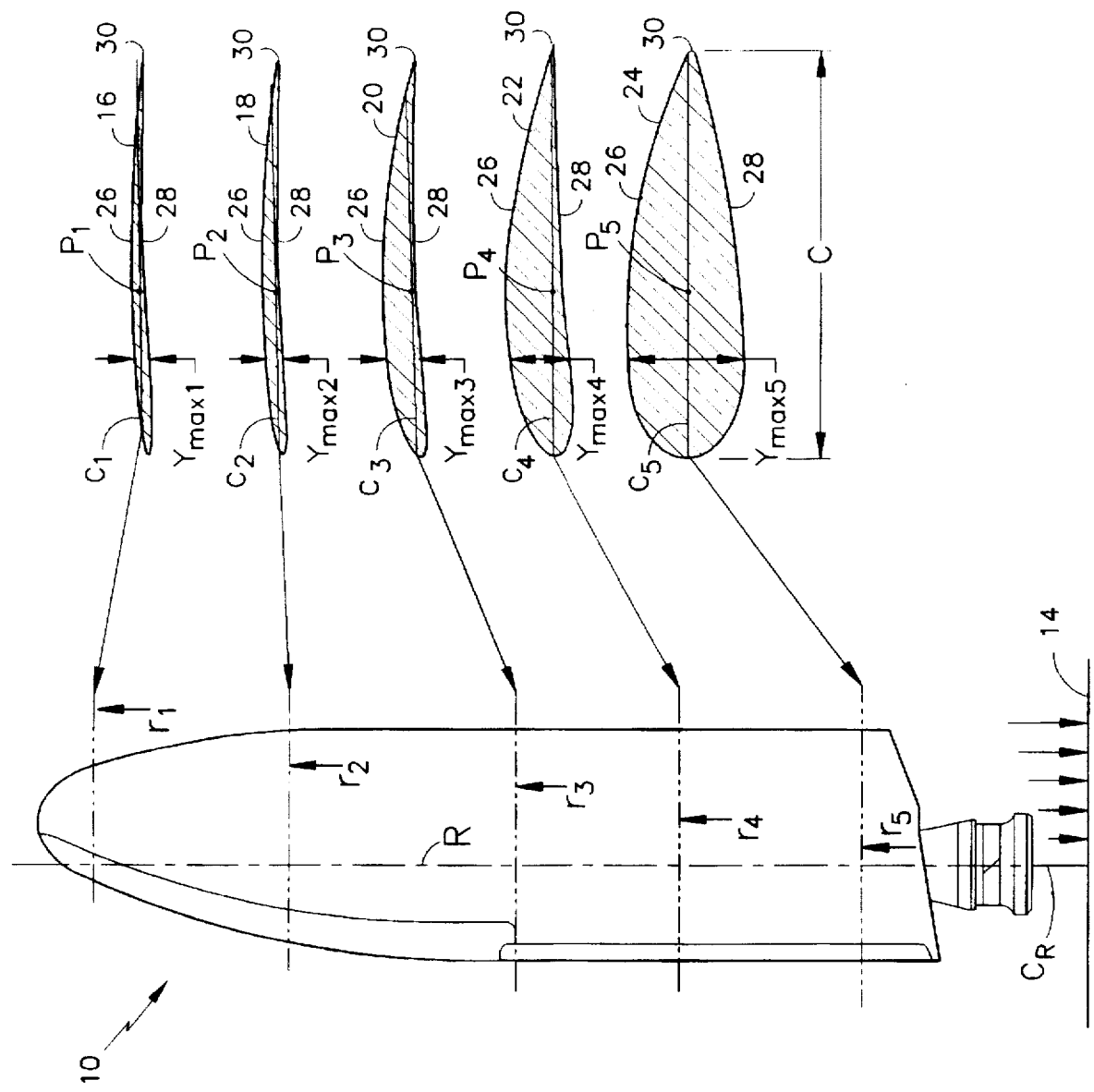
FIG. 2 is an illustration of an airfoiled blade in accordance with the principles of the present invention, showing a series of cross-sectional elevations of the airfoils comprising the blade, along with a plan view of the blade indicating the exemplary locations of the airfoils, wherein the sections of various airfoils are enlarged to show the details thereof.

Referring now to the drawings in detail, there is shown in FIG. 2 an airfoiled blade in accordance with the principles of the present invention, designated generally as 10. Blade 10 includes a plurality of airfoils 16, 18, 20, 22, and 24. Each airfoil has a chord c with a maximum thickness $y_{max}$ and a length c, and is characterized by a thickness ratio, wherein $y_{max}/c$=the maximum thickness of the airfoil divided by its chord length.

Accordingly, airfoil section 16 has a thickness ratio of 0.033 (3.3%), airfoil section 18 has a thickness ratio of 0.0410 (4.1%), airfoil section 20 has a thickness ratio of 0.0730 (7.3%), airfoil section 22 has a thickness ratio of 0.1430 (14.3%), and airfoil section 24 has a thickness ratio of 0.2740 (27.4%).

Referring still to FIG. 2, the positions of the airfoils on the radius of length R of blade 10 are also shown, wherein r/R=a nondimensionalized distance from the base 14 of the center of rotation $C_R$ of blade 10 to the airfoil.

Accordingly, airfoil 16 is located at a position $r_1$ which is 0.9434 (substantially 94%) of the length R; airfoil 18 is located at a position $r_2$ which is 0.7623 (substantially 76%) of radius length R; airfoil 20 is located at a position $r_3$ which is 0.5186 (substantially 52%) of radius length R; airfoil 22 is located at position $r_4$ which is 0.2963 (substantially 30%) of radius R; and airfoil 24 is located at position $r_5$ which is 0.1729 (substantially 17%) of radius R. The cross sections shown in FIG. 2 are taken at these coordinates along the blade longitudinal axis or radius R from the base 14 of center of rotation $C_R$. It is understood that all the chords in the airfoil sections, $c_1$, $c_2$, $c_3$, $c_4$, and $c_5$, of the airfoil sections 16, 18, 20, 22, and 24, respectively, are shown as having common lengths c. Design considerations which may require blade taper will dictate the relative sizes of the airfoil sections of the present invention.

Cross sections of the blade in the areas between the airfoil sections shown in FIG. 2, such as between airfoil sections 16 and 18, are defined by transitional surfaces which connect the corresponding portions between any two adjacent airfoil shapes, such as airfoil sections 16 and 18, as is well known in the art. The airfoil cross sections will, of course, be angularly displaced from one another in a manner well known in the art to impart sufficient twist to the blade to establish varying blade angles of attack dictated by aerodynamic performance requirements. The following tables list precise dimensionless coordinates of a number of airfoil sections of an embodiment of a blade of the present invention, wherein x/c=dimensionless locations of points on the blade chord line, wherein x/c defines the distance along the chords $c_1$, $c_2$, $c_3$, $c_4$, and $c_5$ as measured from the trailing edge 30, divided by the length of these chords;

y/c upper=the dimensionless heights from the chord lines to points on blade suction surface 26; and y/c lower=the dimensionless heights from the chord lines $c_1$, $c_2$, $c_3$, $c_4$, and $c_5$, to points on blade pressure surface 28. Specifically, y/c defines the heights or distances from the chord line to the blade suction and blade pressure surfaces divided by the length of the chord of the blade.

Figure 3:
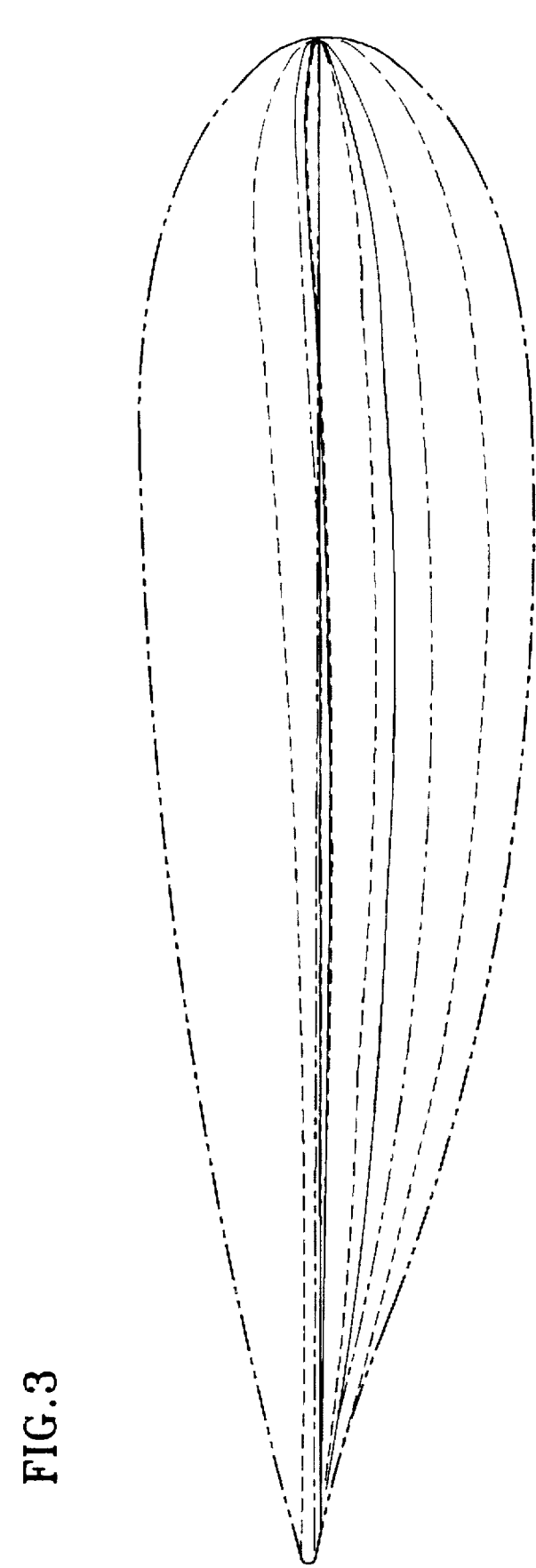
FIG. 3 is a graphical overlay representation of the relationship of the airfoil sections of the blade.

As discussed above, the shapes of the particular airfoil sections described by tables 1–5 below are shown in FIGS. 2 and 3.

TABLE 1

HSIA AIRFOIL ORDINATES - $Y_{MAX/C}$ = 0.033
FOR AIRFOIL SECTION 16

| Upper Surface | | Lower Surface | |
|---|---|---|---|
| X/C | Y/C | X/C | Y/C |
| 0.000000 | −0.015558 | 0.000000 | −0.015558 |
| 0.000042 | −0.015199 | 0.000043 | −0.015823 |
| 0.000160 | −0.014870 | 0.000165 | −0.016023 |
| 0.000427 | −0.014437 | 0.000557 | −0.016463 |
| 0.000769 | −0.014048 | 0.001038 | −0.016847 |
| 0.001790 | −0.013127 | 0.001750 | −0.017208 |
| 0.003000 | −0.012341 | 0.002456 | −0.017488 |
| 0.005825 | −0.010911 | 0.003836 | −0.017940 |
| 0.008714 | −0.009725 | 0.006913 | −0.018653 |
| 0.014518 | −0.007761 | 0.009971 | −0.019164 |
| 0.024065 | −0.005178 | 0.016001 | −0.019893 |
| 0.037210 | −0.002312 | 0.025787 | −0.020656 |
| 0.052046 | 0.000342 | 0.039134 | −0.021259 |
| 0.065769 | 0.002445 | 0.054115 | −0.021583 |
| 0.082157 | 0.004636 | 0.067925 | −0.021668 |
| 0.110864 | 0.007859 | 0.084379 | −0.021579 |
| 0.148221 | 0.011178 | 0.113126 | −0.021077 |
| 0.192039 | 0.014077 | 0.150381 | −0.020012 |
| 0.237487 | 0.016233 | 0.193957 | −0.018453 |
| 0.283913 | 0.017806 | 0.239120 | −0.016696 |
| 0.336397 | 0.018972 | 0.285239 | −0.014936 |
| 0.387789 | 0.019490 | 0.337308 | −0.013208 |
| 0.439624 | 0.019429 | 0.388275 | −0.011920 |
| 0.496615 | 0.018750 | 0.439732 | −0.011056 |
| 0.552994 | 0.017453 | 0.496365 | −0.010566 |
| 0.609962 | 0.015442 | 0.552437 | −0.010495 |
| 0.659044 | 0.013124 | 0.609150 | −0.010745 |
| 0.695965 | 0.011029 | 0.658085 | −0.011135 |
| 0.730529 | 0.008792 | 0.694928 | −0.011511 |
| 0.767211 | 0.006136 | 0.729449 | −0.011930 |
| 0.797324 | 0.003739 | 0.766122 | −0.012459 |
| 0.828581 | 0.001075 | 0.796249 | −0.012983 |
| 0.858164 | −0.001622 | 0.827551 | −0.013609 |
| 0.880102 | −0.003713 | 0.857208 | −0.014303 |
| 0.903533 | −0.006018 | 0.879225 | −0.014873 |
| 0.921133 | −0.007789 | 0.902759 | −0.015525 |
| 0.933530 | −0.009053 | 0.920447 | −0.016037 |
| 0.948157 | −0.010562 | 0.932912 | −0.016407 |
| 0.962533 | −0.012061 | 0.947622 | −0.016849 |
| 0.970973 | −0.012951 | 0.962082 | −0.017290 |
| 0.976669 | −0.013557 | 0.970572 | −0.017552 |
| 1.000000 | −0.016076 | 0.976311 | −0.017731 |
|  |  | 1.000000 | −0.018481 |

TABLE 2

HSIA AIRFOIL ORDINATES - $Y_{MAX/C}$ = 0.041
FOR AIRFOIL SECTION 18

| Upper Surface | | Lower Surface | |
|---|---|---|---|
| X/C | Y/C | X/C | Y/C |
| 0.000000 | −0.019330 | 0.000000 | −0.019330 |
| 0.000042 | −0.018884 | 0.000043 | −0.019659 |
| 0.000160 | −0.018475 | 0.000165 | −0.019907 |
| 0.000427 | −0.017937 | 0.000557 | −0.020454 |
| 0.000769 | −0.017451 | 0.001038 | −0.020931 |
| 0.001790 | −0.016309 | 0.001750 | −0.021380 |
| 0.003000 | −0.015333 | 0.002456 | −0.021728 |
| 0.005825 | −0.013556 | 0.003836 | −0.022289 |
| 0.008714 | −0.012082 | 0.006913 | −0.023175 |
| 0.014518 | −0.009643 | 0.009971 | −0.023810 |
| 0.024065 | −0.006433 | 0.016001 | −0.024716 |
| 0.037210 | −0.002873 | 0.025787 | −0.025663 |
| 0.052046 | 0.000425 | 0.039134 | −0.026413 |
| 0.065769 | 0.003038 | 0.054115 | −0.026815 |
| 0.082157 | 0.005760 | 0.067925 | −0.026921 |
| 0.110864 | 0.009764 | 0.084379 | −0.026810 |

TABLE 2-continued

HSIA AIRFOIL ORDINATES - $Y_{MAX/C} = 0.041$ FOR AIRFOIL SECTION 18

| Upper Surface | | Lower Surface | |
|---|---|---|---|
| X/C | Y/C | X/C | Y/C |
| 0.148221 | 0.013888 | 0.113126 | −0.026186 |
| 0.192039 | 0.017490 | 0.150381 | −0.024863 |
| 0.237487 | 0.020168 | 0.193957 | −0.022927 |
| 0.283913 | 0.022122 | 0.239120 | −0.020744 |
| 0.336397 | 0.023571 | 0.285239 | −0.018557 |
| 0.387789 | 0.024215 | 0.337308 | −0.016410 |
| 0.439624 | 0.024139 | 0.388275 | −0.014810 |
| 0.496615 | 0.023295 | 0.439732 | −0.013736 |
| 0.552994 | 0.021684 | 0.496365 | −0.013127 |
| 0.609962 | 0.019185 | 0.552437 | −0.013039 |
| 0.659044 | 0.016305 | 0.609150 | −0.013350 |
| 0.695965 | 0.013703 | 0.658085 | −0.013835 |
| 0.730529 | 0.010924 | 0.694928 | −0.014301 |
| 0.767211 | 0.007624 | 0.729449 | −0.014822 |
| 0.797324 | 0.004646 | 0.766122 | −0.015479 |
| 0.828581 | 0.001335 | 0.796249 | −0.016130 |
| 0.858164 | −0.002015 | 0.827551 | −0.016908 |
| 0.880102 | −0.004613 | 0.857208 | −0.017770 |
| 0.903533 | −0.007477 | 0.879225 | −0.018479 |
| 0.921133 | −0.009677 | 0.902759 | −0.019289 |
| 0.933530 | −0.011248 | 0.920447 | −0.019925 |
| 0.948157 | −0.013122 | 0.932912 | −0.020384 |
| 0.962533 | −0.014985 | 0.947622 | −0.020933 |
| 0.970973 | −0.016091 | 0.962082 | −0.021481 |
| 0.976669 | −0.016844 | 0.970572 | −0.021807 |
| 1.000000 | −0.019973 | 0.976311 | −0.022029 |
| | | 1.000000 | −0.022961 |

TABLE 3

HSIA AIRFOIL ORDINATES - $Y_{MAX/C} = 0.0730$ FOR AIRFOIL SECTION 20

| Upper Surface | | Lower Surface | |
|---|---|---|---|
| X/C | Y/C | X/C | Y/C |
| 0.0 | −0.035642 | 0.0 | −0.035642 |
| 0.000018 | −0.035182 | 0.000086 | −0.036609 |
| 0.000060 | −0.034792 | 0.000274 | −0.037337 |
| 0.000159 | −0.034237 | 0.000778 | −0.038426 |
| 0.000348 | −0.033522 | 0.002164 | −0.040113 |
| 0.006551 | −0.024885 | 0.004980 | −0.042124 |
| 0.013564 | −0.019259 | 0.009982 | −0.044333 |
| 0.028557 | −0.010520 | 0.018560 | −0.046677 |
| 0.055168 | 0.000535 | 0.034618 | −0.049113 |
| 0.083784 | 0.009302 | 0.062071 | −0.050747 |
| 0.120039 | 0.017717 | 0.091165 | −0.050763 |
| 0.158320 | 0.024423 | 0.127263 | −0.049452 |
| 0.199544 | 0.029847 | 0.164837 | −0.047192 |
| 0.249522 | 0.034545 | 0.205160 | −0.044244 |
| 0.298936 | 0.037613 | 0.253966 | −0.040454 |
| 0.344795 | 0.039313 | 0.302215 | −0.036880 |
| 0.389598 | 0.040016 | 0.346958 | −0.033985 |
| 0.428141 | 0.039857 | 0.390576 | −0.031713 |
| 0.464995 | 0.038965 | 0.428147 | −0.030257 |
| 0.509907 | 0.036786 | 0.464210 | −0.029297 |
| 0.553882 | 0.033530 | 0.508745 | −0.028634 |
| 0.608822 | 0.028198 | 0.551637 | −0.028437 |
| 0.661187 | 0.022177 | 0.605842 | −0.028663 |
| 0.707103 | 0.016369 | 0.657686 | −0.029255 |
| 0.749849 | 0.010569 | 0.703263 | −0.030016 |
| 0.782424 | 0.005836 | 0.745844 | −0.030921 |
| 0.812013 | 0.001208 | 0.778418 | −0.031763 |
| 0.842412 | −0.003947 | 0.808080 | −0.032674 |
| 0.870233 | −0.009019 | 0.838714 | −0.033795 |
| 0.892066 | −0.013202 | 0.866908 | −0.035008 |
| 0.912004 | −0.017163 | 0.889091 | −0.036080 |
| 0.932171 | −0.021354 | 0.909363 | −0.037135 |

TABLE 3-continued

HSIA AIRFOIL ORDINATES - $Y_{MAX/C} = 0.0730$ FOR AIRFOIL SECTION 20

| Upper Surface | | Lower Surface | |
|---|---|---|---|
| X/C | Y/C | X/C | Y/C |
| 0.959846 | −0.027489 | 0.929924 | −0.038261 |
| 0.981942 | −0.032651 | 0.958256 | −0.039877 |
| 1.000000 | −0.036876 | 0.980869 | −0.041213 |
| | | 1.000000 | −0.042393 |

TABLE 4

HSIA AIRFOIL ORDINATES - $Y_{MAX/C} = 0.1430$ FOR AIRFOIL SECTION 22

| Upper Surface | | Lower Surface | |
|---|---|---|---|
| X/C | Y/C | X/C | Y/C |
| 0.0 | −0.069808 | 0.0 | −0.069808 |
| 0.000995 | −0.062459 | 0.000389 | −0.073946 |
| 0.002797 | −0.057057 | 0.001700 | −0.078125 |
| 0.005129 | −0.052154 | 0.003643 | −0.081669 |
| 0.009873 | −0.044809 | 0.007577 | −0.086476 |
| 0.014631 | −0.039098 | 0.011072 | −0.089665 |
| 0.020766 | −0.032992 | 0.034526 | −0.102488 |
| 0.031392 | −0.024292 | 0.048418 | −0.106932 |
| 0.043676 | −0.015999 | 0.061626 | −0.109984 |
| 0.059650 | −0.007013 | 0.079122 | −0.112771 |
| 0.075868 | 0.000624 | 0.096075 | −0.114474 |
| 0.093044 | 0.007460 | 0.113500 | −0.115476 |
| 0.113874 | 0.014374 | 0.133839 | −0.115925 |
| 0.134791 | 0.020092 | 0.154023 | −0.115780 |
| 0.167416 | 0.027082 | 0.185157 | −0.114692 |
| 0.209060 | 0.033392 | 0.224558 | −0.112293 |
| 0.248648 | 0.037352 | 0.261773 | −0.109432 |
| 0.286781 | 0.039741 | 0.297520 | −0.106489 |
| 0.325254 | 0.041047 | 0.333562 | −0.103600 |
| 0.360033 | 0.041450 | 0.366061 | −0.101234 |
| 0.399234 | 0.041136 | 0.402598 | −0.098964 |
| 0.432706 | 0.040259 | 0.433968 | −0.097370 |
| 0.468830 | 0.038673 | 0.468143 | −0.095962 |
| 0.498364 | 0.036861 | 0.496251 | −0.094997 |
| 0.565416 | 0.030907 | 0.560372 | −0.093185 |
| 0.624067 | 0.023452 | 0.617126 | −0.091746 |
| 0.680901 | 0.014080 | 0.672849 | −0.090268 |
| 0.726024 | 0.005094 | 0.717515 | −0.088983 |
| 0.774636 | −0.006064 | 0.766140 | −0.087527 |
| 0.811677 | −0.015496 | 0.803421 | −0.096444 |
| 0.871654 | −0.032246 | 0.864527 | −0.084899 |
| 0.913298 | −0.044736 | 0.907593 | −0.084091 |
| 0.945477 | −0.054738 | 0.941115 | −0.083654 |
| 0.968450 | −0.062023 | 0.965129 | −0.083420 |
| 0.983818 | −0.066962 | 0.981229 | −0.083269 |
| 1.000000 | −0.072239 | 1.000000 | |

TABLE 5

HSIA AIRFOIL ORDINATES - $Y_{MAX/C} = 0.2740$ FOR AIRFOIL SECTION 24

| Upper Surface | | Lower Surface | |
|---|---|---|---|
| X/C | Y/C | X/C | Y/C |
| 0.0 | −0.132251 | 0.0 | −0.132251 |
| 0.000375 | −0.124936 | 0.002356 | −0.150223 |
| 0.023624 | −0.073821 | 0.008675 | −0.166228 |
| 0.081404 | −0.028669 | 0.019194 | −0.182070 |
| 0.148288 | −0.002633 | 0.035906 | −0.199117 |
| 0.183298 | 0.005393 | 0.055081 | −0.213151 |
| 0.216093 | 0.010391 | 0.093716 | −0.232108 |

TABLE 5-continued

HSIA AIRFOIL ORDINATES - $Y_{MAX/C} = 0.2740$
FOR AIRFOIL SECTION 24

| Upper Surface | | Lower Surface | |
|---|---|---|---|
| X/C | Y/C | X/C | Y/C |
| 0.275533 | 0.014686 | 0.162797 | −0.249484 |
| 0.329526 | 0.014837 | 0.225678 | −0.255223 |
| 0.383427 | 0.012602 | 0.254914 | −0.255956 |
| 0.449106 | 0.007490 | 0.281842 | −0.255939 |
| 0.513068 | 0.000261 | 0.329612 | −0.254967 |
| 0.577990 | −0.009493 | 0.373877 | −0.253566 |
| 0.641677 | −0.021809 | 0.416302 | −0.251970 |
| 0.687077 | −0.032488 | 0.466985 | −0.249570 |
| 0.731234 | −0.044476 | 0.517345 | −0.246310 |
| 0.774023 | −0.057496 | 0.571779 | −0.241440 |
| 0.815950 | −0.071371 | 0.630392 | −0.234334 |
| 0.860548 | −0.087055 | 0.674335 | −0.227654 |
| 0.904519 | −0.103140 | 0.717999 | −0.219922 |
| 0.932719 | −0.113618 | 0.760571 | −0.211490 |
| 0.960853 | −0.124073 | 0.801614 | −0.202724 |
| 0.993924 | −0.136239 | 0.845506 | −0.192892 |
| 1.000000 | −0.138454 | 0.890814 | −0.182529 |
| | | 0.921050 | −0.175667 |
| | | 0.951602 | −0.168933 |
| | | 0.987589 | −0.161488 |
| | | 1.000000 | −0.159092 |

As illustrated in FIG. 2 with regard to the airfoil sections and as detailed in the tables set forth above, each of airfoils 16, 18, 20, 22 and 24 have a maximum thickness, $y_{max}$ located forward of the 50% x/c chord position, indicated as points $P_1$, $P_2$, $P_3$, $P_4$, and $P_5$, in FIG. 2. respectively. Accordingly, the maximum thicknesses $y_{max1}$, $y_{max2}$, $y_{max3}$, $y_{max4}$, and $y_{max5}$ are located forward of these points, as shown in FIG. 2. In addition, as can be seen in FIG. 2, each of the airfoil sections has a large, blunt, parabolic leading edge and large trailing edge radii and each are front loaded airfoils. The front loading is due to the location of maximum thickness being forward of the 50% x/c point, toward the leading edge. The airfoils are related to each other as can be seen in the overlay of FIG. 3 and form a smooth, continuous surface when used in a propeller blade. Airfoils 16–24 have a specific relationship between camber and thickness ratio $y_{max/c}$ and cannot be scaled to other camber levels.

A comparison of the performance characteristic values of the prior art blades, as provided in the tables of FIGS. 1A–1C for the HS1 and HS2 propeller blades of Hamilton Standard, and discussed in the background, with the performance characteristics of the blade of the present invention, is provided in the tables of FIGS. 4A–4C. It can be seen that as the 50, 110, and 300 knot conditions, the drag of the airfoils of the present invention compared to the airfoils of the HS1 and HS2 blades at the same thickness ratios, and specifically the 110 and 300.5 knot conditions is an improvement over the prior art when CD values are compared. Also, comparison of X SEP values shows that the extent of separation is less for the airfoils of the blade of the present invention. At the 300.5 knot condition, the airfoils of the present invention, with the lower drags, obtain gains in cruise efficiency of close to 0.9% in a propeller blade.

At the 110 knot takeoff condition, the propeller blade performance increases by 0.1%. While the airfoil having the 0.143 thickness ratio is comparatively worse than the prior art airfoil shown for the same thickness ratio, the overall performance of the blade is a substantial improvement.

Figure 5:
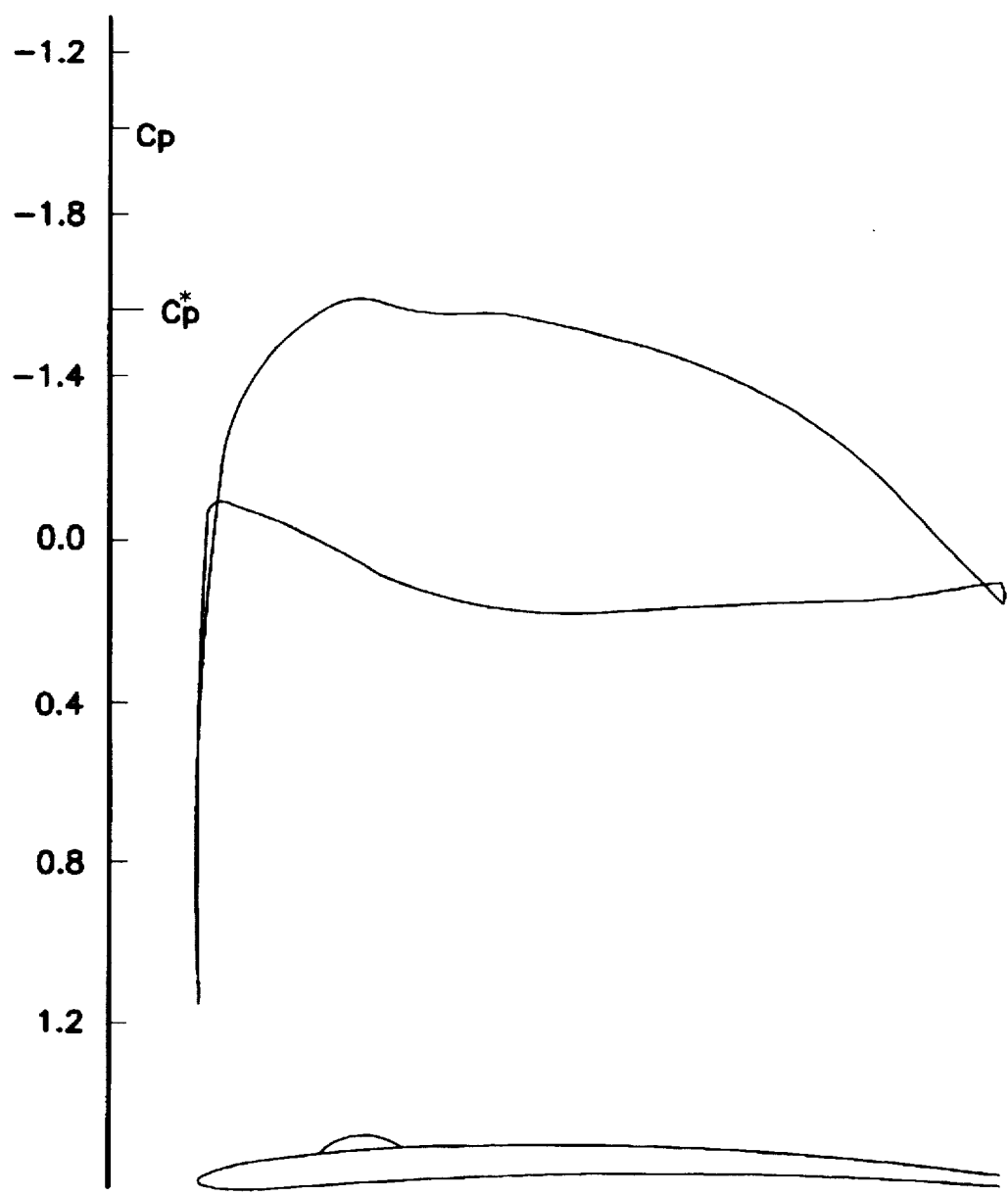
FIG. 5 is a graph representative of the performance of the airfoils of the present invention having a 0.041 thickness ratio, at cruise and 300.5 knots, which is also represented by the table of FIG. 4C, wherein the pressure distribution on the blade is shown on the upper part while the lower part shows the airfoil shape with the boundary layer and sonic regions.

A graph representative of the performance of the airfoils of the present invention is shown in FIG. 5, specifically for airfoil 18 having the 0.041 thickness ratio in cruise at 300.5 knots, which is also represented by the table of FIG. 4C, wherein MN=Airfoil or aircraft operating mach number;
$C_p$=Airfoil surface pressure coefficient $((P_{local}-P_{infinity})/Q_{infinity})$; and
$C_p^*$=Pressure coefficient for a surface Mach number equal to one.

Figure 6:
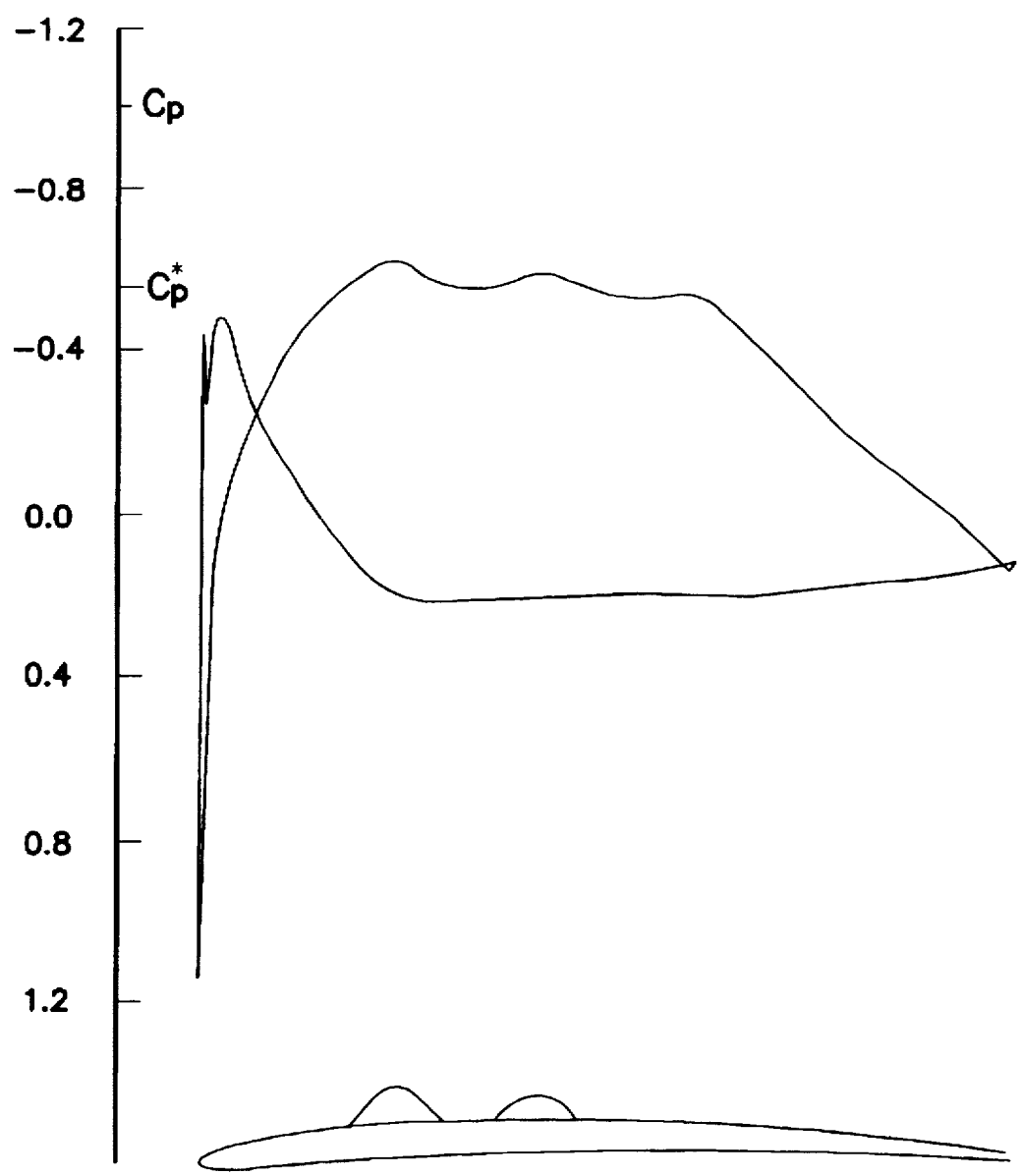
FIG. 6 is a graph similar to that of FIG. 5 for the prior art airfoiled blade HS1 at the same thickness ratio and speed.
Figure 7:
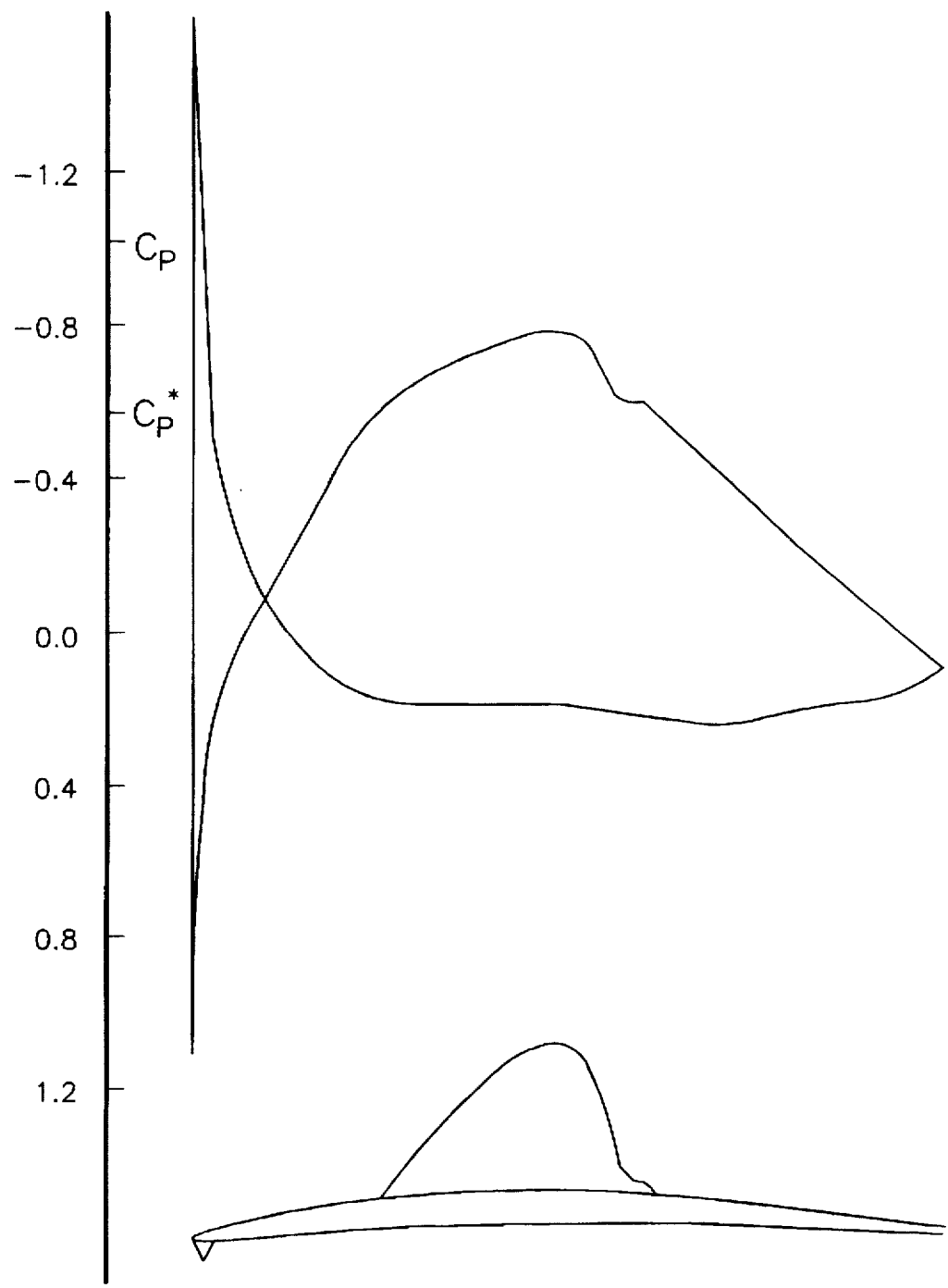
FIG. 7 is a graph similar to that of FIG. 5 but for the prior art airfoiled blade HS2 at the same thickness ratio and speed.

For this FIG. 5, the pressure distribution on the blade is shown on the upper part of the FIGURE while the lower part shows the airfoil shape with the boundary layer and sonic regions added. FIGS. 6 and 7 show the prior art blades HS1 and HS2, discussed in the background section, and the pressure distribution in the upper area thereof and boundary layer and sonic regions thereof in the lower area, for comparison to FIG. 5, large or multiple sonic regions result in increased airfoil drag. Similar to FIG. 5, the FIG. 6 and FIG. 7 graphs have been provided for the airfoil of the prior art blade having the 0.041 thickness ratio at 300.5 knot cruise, with the same MN and CL. For the airfoil of the HS1 prior art blade shown in FIG. 6, there are two sonic regions in the upper surface and a small spike at the leading edge. The long tail on the lower graphical drawing indicates the $C_p$ for sonic velocity. A wavy upper surface pressure distribution can also be seen. In FIG. 7 for the HS2 prior art blade and 0.041 airfoil, under the same operating condition, a large upper surface sonic region terminated by a weak shock in a small high sonic region at the leading edge at the lower surface, is shown in the lower graphical drawing. As can be seen by comparing the airfoiled blade of the present invention to that of the airfoils of the HS1 and HS2 blades, it is obvious that the airfoil of the present invention with its sheath pressure distribution has much better flow characteristics on both the upper and lower surfaces. Further, as indicated by these figures, the airfoils of the present invention have lower surface Mach numbers at cruise operating conditions, conducive to cargo transport aircraft, in comparison to other available airfoils. When used in a propeller blade, these airfoils result in a substantially 1% better cruise performance and a 0.2% better takeoff performance.

The particular blade described herein is described to cruise optimally at about Mach 0.58 to 0.60. As indicated, these airfoils have a specific relationship between camber and thickness ratio and cannot be scaled to other camber levels.

The primary advantage of this invention is that an improved airfoiled blade is provided having a new airfoil system comprising the same. Another advantage of this invention is that an improved airfoiled blade is provided for use as a propeller, wherein airfoils comprising the blade are specifically designed for use with a cargo transport aircraft for producing high static thrusts and efficient performance in cruise. Yet another advantage of this invention is that an improved airfoiled blade is provided for use as propeller of a cargo aircraft, wherein the blade results in propeller performance levels which surpass blades having currently available airfoil families.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A blade having a plurality of airfoil sections, a base portion, and a tip portion, comprising:
   each airfoil section having along substantially the entire length thereof a cross-sectional airfoil shape characterized by a parabolic leading edge, a front loading and a blunt trailing edge, wherein each of said airfoil sections has a chord passing therethrough with a 50% point and a maximum thickness forward of said 50% point and toward said leading edge; and a thickness ratio range from a first of said airfoil sections nearest said tip portion to a last of said airfoil sections nearest said root portion of substantially 3% to 28%.

2. The blade according to claim to claim 1, further including a second airfoil section, a third airfoil section and a fourth airfoil section located between said first and last airfoil sections, wherein said first airfoil section has a thickness ratio of substantially 3.3%, said second airfoil section has a thickness ratio of substantially 4.1%, said third airfoil section has a thickness ratio of substantially 7.3%, said fourth airfoil section has a thickness ratio of substantially 14.3%, and said last airfoil section has a thickness ratio of substantially 27.4%.

3. The blade according to claim 1, wherein said blade has a length, and wherein said first airfoil section is positioned at a location from said base which is substantially 94% of said length, said second airfoil section is positioned at a location from said base which is substantially 76% of said length, said third airfoil section is positioned at a location from said base which is substantially 52% of said length, said fourth airfoil section is positioned at a location from said base which is substantially 30% of said length, and said fifth airfoil section is positioned at a location from said base which is substantially 17% of said length.

4. The blade according to claim 1, having an operational Mach number of between 0.58 and 0.60.

* * * * *